J. R. BLAKESLEE.
MECHANISM FOR MAKING NUTS AND THE LIKE.
APPLICATION FILED FEB. 4, 1913.

1,119,492.

Patented Dec. 1, 1914.

Witnesses=
Oliver M. Kappler
Robert M. Sx

Inventor
John R. Blakeslee
By Fay and Oberlin
Attorneys-

J. R. BLAKESLEE.
MECHANISM FOR MAKING NUTS AND THE LIKE.
APPLICATION FILED FEB. 4, 1913.

1,119,492.

Patented Dec. 1, 1914.

2 SHEETS—SHEET 2.

Witnesses=
Oliver M. Kappler.
Robert M. See

Inventor
John R. Blakeslee
By Jay and Oberlin
Attorneys

UNITED STATES PATENT OFFICE.

JOHN R. BLAKESLEE, OF CLEVELAND, OHIO, ASSIGNOR TO THE AJAX MANUFACTURING COMPANY, OF CLEVELAND, OHIO, A CORPORATION OF OHIO.

MECHANISM FOR MAKING NUTS AND THE LIKE.

1,119,492.          Specification of Letters Patent.          Patented Dec. 1, 1914.

Application filed February 4, 1913. Serial No. 746,137.

*To all whom it may concern:*

Be it known that I, JOHN R. BLAKESLEE, a citizen of the United States, and a resident of Cleveland, county of Cuyahoga, and State of Ohio, have invented a new and useful Improvement in Mechanism for Making Nuts and the like, of which the following is a specification, the principle of the invention being herein explained and the best mode in which I have contemplated applying that principle, so as to distinguish it from other inventions.

The present invention relates to machines for making nuts and its principal object is the provision of a machine which will manufacture nuts with a high degree of economy and accuracy.

To the accomplishment of these and related ends said invention then consists of the means hereinafter fully described and particularly pointed out in the claims.

The annexed drawings and the following description set forth in detail certain mechanism embodying the invention, such disclosed method and means each constituting, however, but one of various forms in which the principle of the invention may be used.

Figure 1:
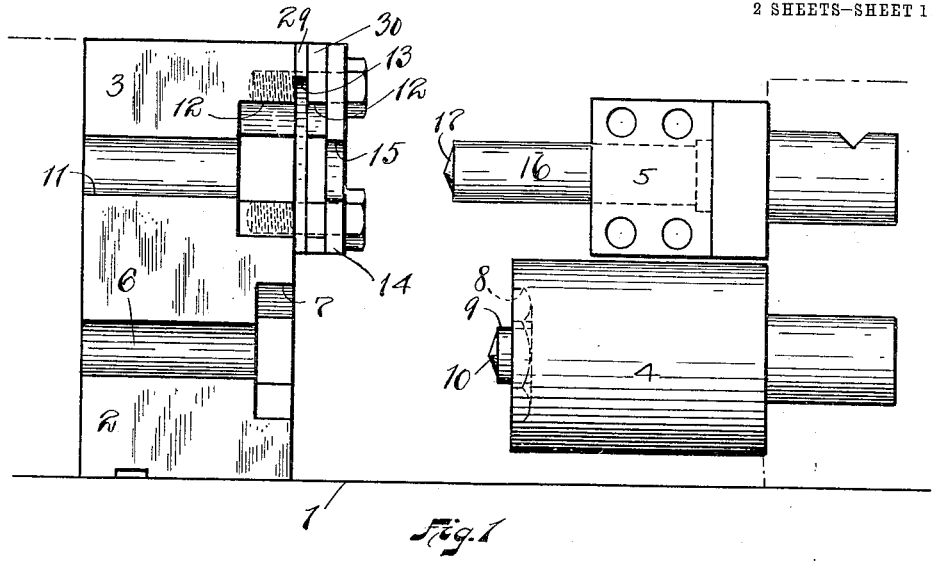
Figure 3:
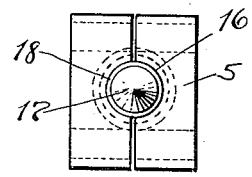
Figure 2:
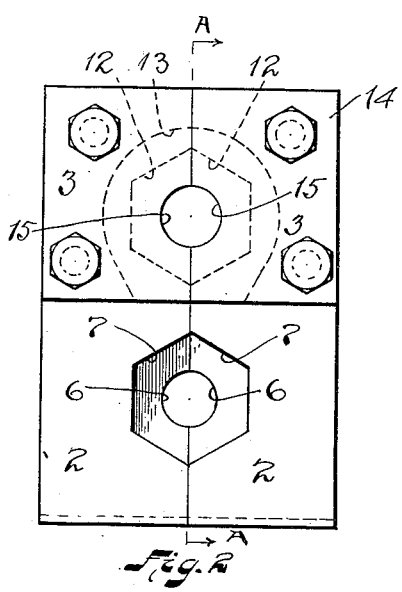
Figure 4:
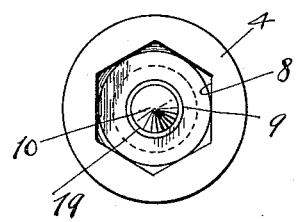
Figure 5:
Figure 6:
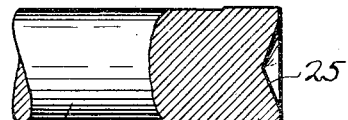
Figure 7:
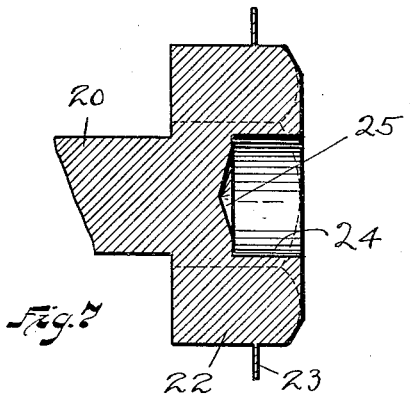
Figure 8:
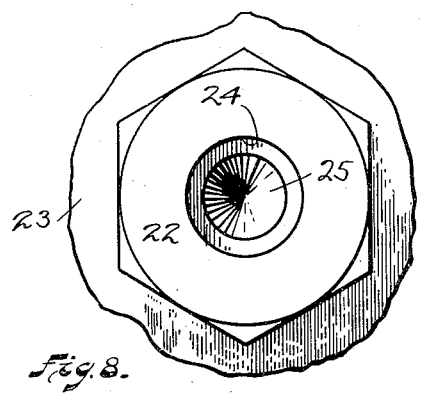
Figure 9:
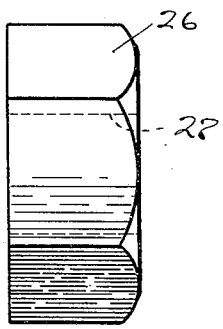
Figure 10:
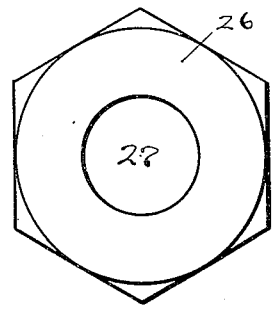

In said annexed drawings:—Figure 1 is a side elevation of two dies complementary with two dies not shown, and of two reciprocable plungers coöperative with the dies; Fig. 2 is a front elevation of the dies in closed position; Fig. 3 is a front elevation of the upper reciprocable plunger shown in Fig. 1; Fig. 4 is a front elevation of the lower reciprocable plunger; Fig. 5 is a broken, partly sectioned view of the bar of stock; Fig. 6 is a similar view of the bar of stock after a nut has been severed from it; Fig. 7 is a sectional view of the bar of stock after the first operation of the machine; Fig. 8 is an end elevation thereof; Fig. 9 is a side elevation of a completed nut and Fig. 10 is a front elevation thereof.

The complete machine embodying the present invention includes a machine bed 1 and mechanism for actuating the various parts of the machine, but since the bed and actuating mechanism are of ordinary construction, the mechanism has not been illustrated and the machine bed is merely diagrammatically illustrated. Two dies 2 are mounted on the bed, one fixedly and one transversely reciprocable and above the dies 2, two dies 3 are similarly mounted, the dies 3 being either separate from the dies 2 or integral therewith, as shown in the drawings. A plunger 4 suitably supported, is reciprocable toward and from the dies 2, and a plunger 5 is reciprocable toward and from the dies 3, and the two plungers may be reciprocable in unison or individually.

The two dies 2 are formed longitudinally with complementary recesses 6 adapted when the dies are closed, to grip a bar of stock extending through the dies, and this recess in the closed dies will preferably and generally be cylindrical in cross section. In the front face of the dies 2 are formed two complementary recesses 7 which are of the cross sectional shape of the nut the machine is designed to manufacture. The reciprocable plunger 4 which is disposed opposite the dies 2, is preferably formed with a recess 8 in its front face complementary with the recess 7 in the dies 2, so that when the plunger is advanced until its face contacts with the face of the dies 2, the recesses 7 and 8 together will form the desired exterior shape of the nut to be made. It is to be understood, however, that the plunger 4 may be formed without the recess 8 and dependence placed upon a recess 7 to form the nut. A punch 9 projects from the front face of the plunger 4 and its body is of uniform cross sectional shape and at least co-extensive in cross sectional area with the recess 6 with which it is alined; the uniform body of the punch 9 has at its end a conical portion 10, the base of which is of less width than the body 9, so that a shoulder 19 is left at the end of the punch. The length of the body of the punch projecting beyond the face of the plunger 4 is less than the depth of the recess 7, so that when the plunger is in advance position the punch will extend into the recess but will not extend to the inner end thereof.

The dies 3 are formed with complementary recesses 11 and the recess formed thereby when the dies are closed is slightly larger than the recess 6 of the closed dies 2. The end of the recess 11 toward the front face of the dies opens into a recess 12 formed by complementary recesses in the two dies 3, the recess 12 being of the same cross sectional shape as the recess 7. The recess 12, however, is formed between its ends with a peripheral enlargement 13 and the portion of the recess 12 inwardly beyond the enlargement 13 is of greater depth than the depth of the recess 7 and preferably greater than the depth of the nut to be made. A preferable construction of the dies 3, in order to form the enlargement 13, is to bolt a plate 29 between plate 30 and the face of the dies 3, the plate 30 having an opening conforming with the recess in the dies themselves, while the plate 29 is formed with the enlarged opening 13. A plate 14 is bolted outside of the plate 30, and is formed with an opening 15 of substantially the same size as the recess 11, and serves in the operation of the machine as a stripping plate. The plunger 5 carries a punch 16, the body of which is of uniform size in cross section, and at least co-extensive in cross sectional area with the bar of stock, the body having at its end a conical projection 17, of such size as to leave a shoulder 18 at the end of the body of the punch. The punch 16 is so positioned that in its advance position the end of the body thereof will extend beyond the inner end of the recess 12.

In operation, the plungers being retracted and the dies 2 and 3 being transversely separated, a bar of stock is fed forwardly between the dies 2, and the reciprocable die is advanced to grip the stock in the recess 6 with a portion of the stock projecting beyond the face of the dies 2. The plunger 4 is then advanced and the end of the stock is upset and is formed by the complementary recesses 7 and 8 into the desired shape of the finished nut. At the same time the punch 9 enters the formed end of the bar of stock and partially punches therethrough a hole of the size desired in the finished nut, this hole terminating at its inner end in a conical depression. In Fig. 5 is shown a bar of stock 20 as it is first fed into the dies 2 and after the actuation of the plunger 4 the end of the bar assumes the form shown in Fig. 7 which illustrates the formed end 22 with the "flash" 23 formed by the spread of the metal between the faces of the die and plunger, the hole 24 extending partially through the formed end 22 and terminating in a conical depression 25. The plunger 4 is then retracted and the dies 2 and 3 separated by movement of the reciprocable pair of dies, and the bar of stock having a formed end is transferred to the recess 11 in one of the dies 3, and the dies closed. When the dies are closed, the flash 23 lies in the enlarged opening 13, while the body of the formed end 22 of the bar of stock lies in the recess 12 on both sides of the enlargement 13. The plunger 5 is then advanced until the conical end of the punch enters the conical depression at the inner end of the hole in the formed end of the bar of stock and continued advancement of the punch forces the stock backwardly through the dies 3, this being permitted because the recess 11 is larger than the bar of stock, and because a very slight clearance is left in the recess 12 and also, of course, because the portion of the recess 12 inwardly beyond the opening 13 is deeper than the recess 7 in the dies 2, and hence deeper than the portion of the formed stock inwardly beyond the flash. As the stock is thus forced back until the inner side of the formed end of the stock comes in contact with the inner end of the recess 12, the flash is trimmed off by the edge of the inner portion of the recess 12, and as the punch still continues thereafter to advance until the end of the body portion reaches the inner end of the recess 12, it punches the hole entirely through the formed end of the bar of stock and thereby severs such end from the remainder of the bar, while the conical end of the punch preserves in the end of the bar of stock, from which the formed end is severed, the conical depression which was initially formed by the end of the punch 9. The dies 3 are then opened and the finished nut 26 with its hole 27 is removed, and the bar of stock is transferred to the dies 2 and the cycle of operations continued. After the bar of stock has been first acted upon in the dies 2, it is formed at its end, after severance of a completed nut, with a conical depression 25 and a slightly enlarged portion 28, as shown in Fig. 6. The enlarged portion 28 is due to the fact that the recess 11 is slightly larger than the bar of stock, and the stock is forced outwardly at its end by the action of the punch 16. The conical depression in the end of the bar of stock is preserved from its first formation during the making of the first nut, until the bar of stock has been completely worked. When the bar with such depression is operated upon in the dies 2, the conical depression centers the punch 9 and thereby avoids buckling of the bar between the dies and the punch, and furthermore the slight enlargement 28 at the end of the bar requires less metal to be upset by the forming dies. When the initially formed bar is transferred to the dies 3, the partially formed hole in the upset end of the bar, together with the conical depression at the inner end thereof provides a centering for the punch 16, and also renders the final punching of the hole through the nut much easier than if it were necessary to punch entirely through the end at one operation, and consequently undesirable distortion of the metal in the finished product is avoided.

Claims for the process practised by the machine of this application have been presented in a divisional application filed May 2, 1914, Serial Number 835,865.

Other modes of applying the principle of my invention may be employed instead of the one explained, change being made as regards the mechanism herein disclosed, provided the means stated by any of the following claims or the equivalent of such stated means be employed.

I therefore claim:—

1. In a machine of the class described, the combination of separable dies having a forming recess through which a bar of stock may extend; a reciprocable upsetting plunger opposite the dies and provided with a punch projecting from the face of the plunger less than the depth of the forming recess; separable dies for holding the bar of stock with a formed end, and having a recess of the same cross-sectional shape as the forming recess; and a reciprocable punch opposite the last-named dies and adapted, in advanced position, to extend to the inner end of the recess in such dies.

2. In a machine of the class described, the combination of separable dies having a forming recess through which a bar of stock may extend; a reciprocable upsetting plunger opposite the dies and provided with a punch projecting from the face of the plunger less than the depth of the forming recess; separable dies for loosely holding the bar of stock with a formed end, and having a recess of the same cross-sectional shape as the forming recess, the recess having a peripheral enlargement between its ends and the depth of the recess inwardly from such enlargement being greater than the depth of the forming recess; and a reciprocable punch opposite the last-named dies and adapted, in advanced position, to extend to the inner end of the recess in such dies.

3. In a machine of the class described, the combination of separable dies having a forming recess through which a bar of stock may extend; a reciprocable upsetting plunger opposite the dies and provided with a punch having a conical projection at the end of its body, the body of the punch projecting from the face of the plunger less than the depth of the forming recess; separable dies for holding the bar of stock with a formed end, and having a recess of the same cross-sectional shape as the forming recess; and a reciprocable punch opposite the last-named dies and having a conical projection at the end of its body, the body of the punch being adapted, in advanced position, to extend to the inner end of the recess in such dies.

4. In a machine of the class described, the combination of separable dies having a forming recess through which a bar of stock may extend; a reciprocable upsetting plunger opposite the dies and provided with a punch having a conical projection at the end of its body, the body of the punch projecting from the face of the plunger less than the depth of the forming recess; separable dies for loosely holding the bar of stock with a formed end, and having a recess of the same cross-sectional shape as the forming recess, the recess having a peripheral enlargement between its ends and the depth of the recess inwardly from such enlargement being greater than the depth of the forming recess; and a reciprocable punch opposite the last-named dies and having a conical projection at the end of its body, the body of the punch being adapted, in advanced position, to extend to the inner end of the recess in such dies.

5. In a machine of the class described, the combination of separable dies having a forming recess through which a bar of stock may extend; a reciprocable upsetting plunger opposite the dies and provided with a punch having a conical projection at the end of its body, the body of the punch projecting from the face of the plunger less than the depth of the forming recess; separable dies for loosely holding the bar of stock with a formed end, and having a recess of the same cross-sectional shape as the forming recess, the recess having a peripheral enlargement between its ends and the depth of the recess inwardly from such enlargement being greater than the depth of the forming recess; a reciprocable punch opposite the last-named dies and having a conical projection at the end of its body, the body of the punch being adapted, in advanced position, to extend to the inner end of the recess in such dies; and an inwardly directed shoulder at the outer end of such recess.

Signed by me this 1st day of February, 1913.

JOHN R. BLAKESLEE.

Attested by—
 R. K. DISSETTE,
 H. J. GIBBONS.

Copies of this patent may be obtained for five cents each, by addressing the "Commissioner of Patents, Washington, D. C."